INVENTOR.
CHARLES H. DOERSAM, JR.
BY
Louis B. Applebaum
ATTORNEY

INVENTOR.
CHARLES H. DOERSAM, JR.
BY W. R. Maltby
Louis B. Applebaum
ATTORNEYS

Jan. 9, 1962 C. H. DOERSAM, JR 3,016,516

PULSE CODE MULTIPLEXING SYSTEMS

Filed Jan. 24, 1957 3 Sheets-Sheet 3

INVENTOR.
CHARLES H. DOERSAM, JR.
BY W R Maltby
Louis B. Applebaum
ATTORNEYS

United States Patent Office
3,016,516
Patented Jan. 9, 1962

3,016,516
PULSE CODE MULTIPLEXING SYSTEMS
Charles H. Doersam, Jr., 24 Winthrope Road, Port Washington, N.Y.
Filed Jan. 24, 1957, Ser. No. 636,214
7 Claims. (Cl. 340—147)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in electronic digital computing apparatus, and more particularly pertains to improvements in pulse code multiplexing systems.

Automatic control and information systems utilizing digital computers and coded information have divers applications wherein digital information from a plurality of sources located remotely from each other is combined. In the past, pulse code multiplexers for such purposes have shared the time equally among the multiplexed sources and have operated on comparatively short code group (i.e. code word) lengths; the subject device provides a simple and reliable means of combining, on a single pulse code radio communication link, digital information from a number of discrete remote sources, at different band widths or code group (code word) repetion rates, and at different precisions (word lengths), with adjunct time and identification codes. The subject device further provides means for checking the accuracy of transmission of each pulse code word automatically.

(The terms "code group" and "code word" are equivalent and refer to a unit of intelligence consisting of a number of spaced elements called pulses, or digits, or bits. A code group has a predetermined number of digit locations, each of which may or may not be occupied. The total number of digit locations is called the full digit potential of the code group.

The terms "precision" and "word length" are also equivalent and refer to the number of elements, or pulses, included in a given code word. In discussing the precision of a source of code information, the maximum number of elements which can be included in the code words generated by that source is generally meant.

In this application, the term "rate of modulation" refers to the pulse repetition rate of the given code system—that is, the rate at which the pulses in a frame would be repeated if all the digit positions in the frame were occupied by the pulses.)

Employing the binary number system, each pulse can represent a one (1) and each absence of a pulse can represent a zero. The input sources to the subject multiplexer system thus can consist of coded information, such as data coded from shaft positions, time intervals, frequencies, voltage levels, or the like. The code will be available as input to the system of the subject device, which identifies each piece of information automatically by setting codes into the digit positions immediately adjoining the information. The information is transferred out of each of the input registers to stepping registers under the control of a matrix, which selects source positions in sequence. The matrix is driven by selected stages of a binary counter working from an external synchronizing means, the matrix determining the channel switching rate and the external synchronizing means determining the rate of modulation, or pulse repetition rate of the multiplexer. The transfer bus is a parallel connection between each of the registers and the stepping register over which each of the information code groups is transferred in sequence when the respective gates are opened by the matrix. The information pulses (or digits, or bits) in each code group are stepped through the stepping register serially. A system of quantizing is used to eliminate the possibility of transferring an erroneous number from the input to the stepping register when the input is changing at the time information transfer is requested by the matrix.

The primary object of this invention is to provide improvements in pulse code multiplexing systems.

Another object is to provide a pulse code multiplexing system wherein digital data from a plurality of remote sources, at different sampling rates and precisions, can be combined on a single pulse code radio communication link.

A further object is to provide a pulse code multiplexing system having adjunct time and identification codes, and quantizing means.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
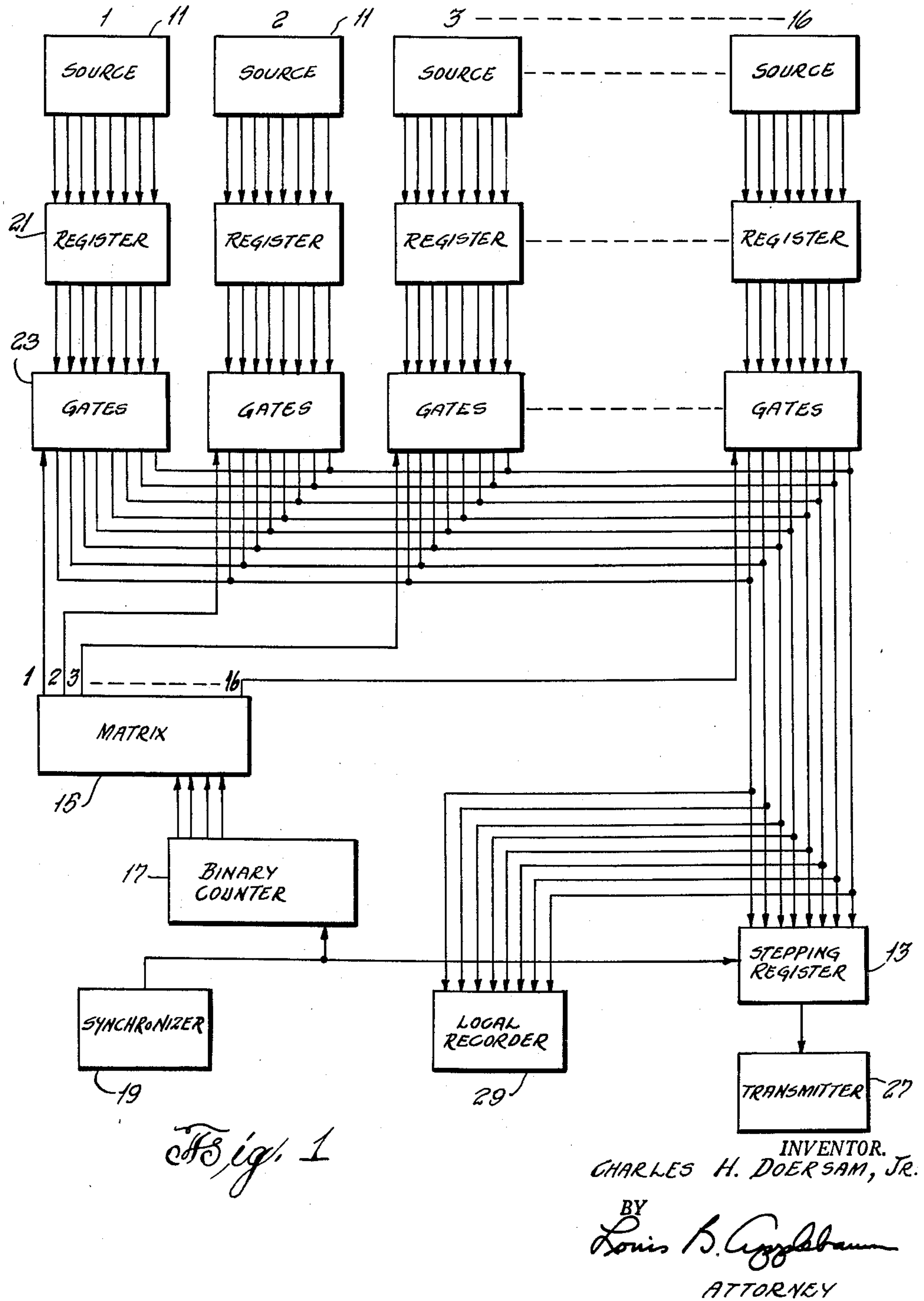
FIG. 1 is a block diagram of a pulse code multiplexer which combines digitally coded information from a plurality of discrete sources on a single communication link.

As shown in FIG. 1, information coded from shaft positions, time intervals, frequencies, voltage levels or other references is available to the system as one or more of a plurality of sources or inputs 11, shown as sixteen inputs each having a capacity of eight digits. Each piece of information can be tagged (identified) automatically by setting one or more code digits (pulses) manually into the digit positions of each input immediately adjoining the information. This type of digitalized information can be characterized as unserialized information since it is unvarying with respect to time as long as the original information (shaft position, etc.) which it represents remains unchanged.

Any desired number of input digits can be allocated to any one source of information; several of the inputs 11 can be allocated to a single source of information. For example, information that originates from a shaft position which is measured to about one part in a thousand can be used, with the shaft and its location identified by a number, for example the number (9). It will therefore require four digits to identify the shaft and its location, and it will require ten digits to transmit the information. The inputs "1" and "2" contain a total of sixteen digits, and so they would both be used, the first fourteen digits of these two inputs being allocated to the information.

The information is transferred out of each of the inputs 11 to the stepping register 13 under the control of the matrix 15. Preferably, the matrix 15 is a four stage, sixteen position normal matrix that selects each of the sixteen inputs 11 in sequence. The matrix 15 is driven by the last four stages of a seven stage binary counter 17 actuated by an external synchronizer 19 which determines the rate of modulation, or the pulse repetition rate, of the multiplier.

(In the pulse code modulation field, the word "link" is commonly used in two different senses. It may denote one of a series of stations forming part of a communication chain, or it may refer to the digit positions in a code group. Thus, a system capable of forming code groups or words having up to eight digits would be said to have eight data transmission links. Modulation of these data transmission links may consist, as it does in the present system, of inserting or not inserting pulses in these positions. The sense in which a particular "link" is employed is usually apparent from the context.

The basic framework, or structure, into which digits generated by a given coding system are fitted is called a frame. The frame embodies the total number of digit positions available for occupation by pulses, although not all positions may be occupied by any particular code group. In repetitive pulse code systems, the frame is repeated at the frame repetition rate which is lower than the pulse repetition rate. The latter is the rate at which the pulses would be repeated if all available digit positions in the frames were occupied.)

Each input 11 is fed through a register 21 and its associated group of gates 23, said gates being coupled to matrix 15 in the conventional manner. The register 21 stores the information until the opening of the gates 23 permits the information to pass through. The outputs of gates 23 are fed to stepping register 13 through transfer bus 25, which is a connection of eight wires, one from each individual gate in any group of gates 23 to the stepping register 13, all groups of gates 23 being connected in parallel to this set of eight wires. All digits in a given number are inserted simultaneously in the stepping register 13 when the gates 23 associated with that number are opened. The digits of said given number are then stepped through the stepping register 13 to the transmitter 27 in sequence, the farthest right-hand digit in each code group being sent to the transmitter 27, and all the remaining digits in the code group being stepped one position to the right, each time the register 13 is actuated. Thus, the rate at which each associated group of gates is opened is the frame repetition rate of the system and the rate at which the individual digits are stepped through the stepping register 13 is the pulse repetition rate of the system. Stepping registers of this type can also be constructed to permit the stepping out of any preselected number of digits, starting from the one at the extreme right side of a given number, or code group, and movement of the remaining digits that number of positions to the right corresponding to the vacated right-side digit positions of the register. A digital type pulse recorder 29 can be coupled either to the input or the output of the stepping register 13, preferably to the input as shown in FIG. 1.

Figure 2:
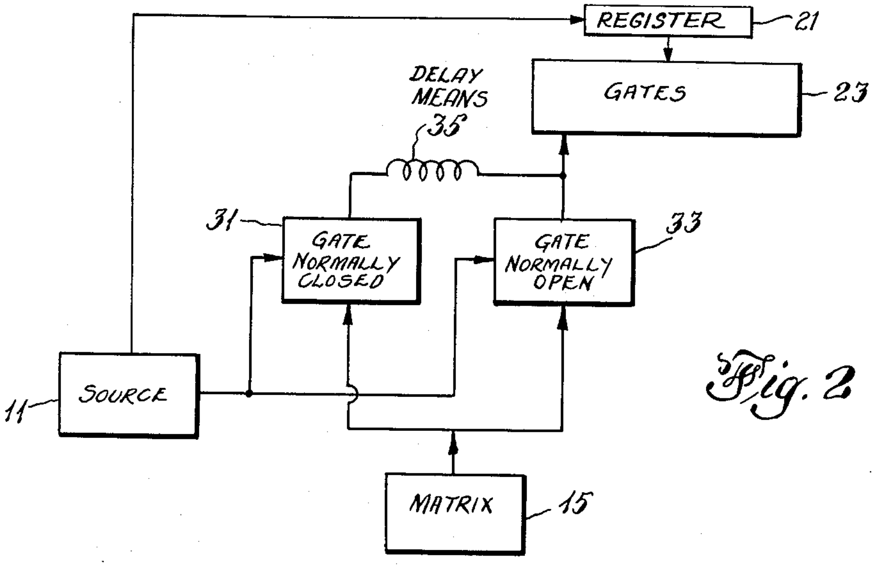
FIG. 2 is a block schematic diagram of a quantizing circuit adapted to be employed in the circuit of FIG. 1.

The possibility of transferring an erroneous number from the input 11 to the stepping register 13 exists normally when the input 11 is changing at the time information transfer is requested by the matrix 15. This possibility is eliminated by the system of quantizing shown in FIG. 2 where a normally closed gate 31 and a normally open gate 33 are connected in parallel between a source 11 and its associated set of gates 23. A delay means 35 is included in the path from the normally closed gate 31 to the gates 23. (It should be understood that this is done for every source 11.) A signal from input 11, delivered only when the input is in the process of changing, is fed in parallel to the normally closed gate 31 and to the normally open gate 33. The coupling of matrix 15 to the gates 23 is also by parallel feed through gates 31 and 33. Delay means 35 is interposed between gates 31 and 23. Thus the signal received from input 11 when it is in the process of changing is used to change the state of the gates 31 and 33 so that delay is introduced in the transfer path, which extends from the source 11 through the input register 21, the gates 23 and the stepping register 13 to the transmitter 27, thus allowing sufficient time for the source to stabilize at its new position. A limiting factor, in a digital system of the type herein described, is the requirement that the sampling rate be several times higher than the bandwidth of the sampled channel, so that the channel will not again be changing during this transfer interval if it has just completed a change.

Figure 3:
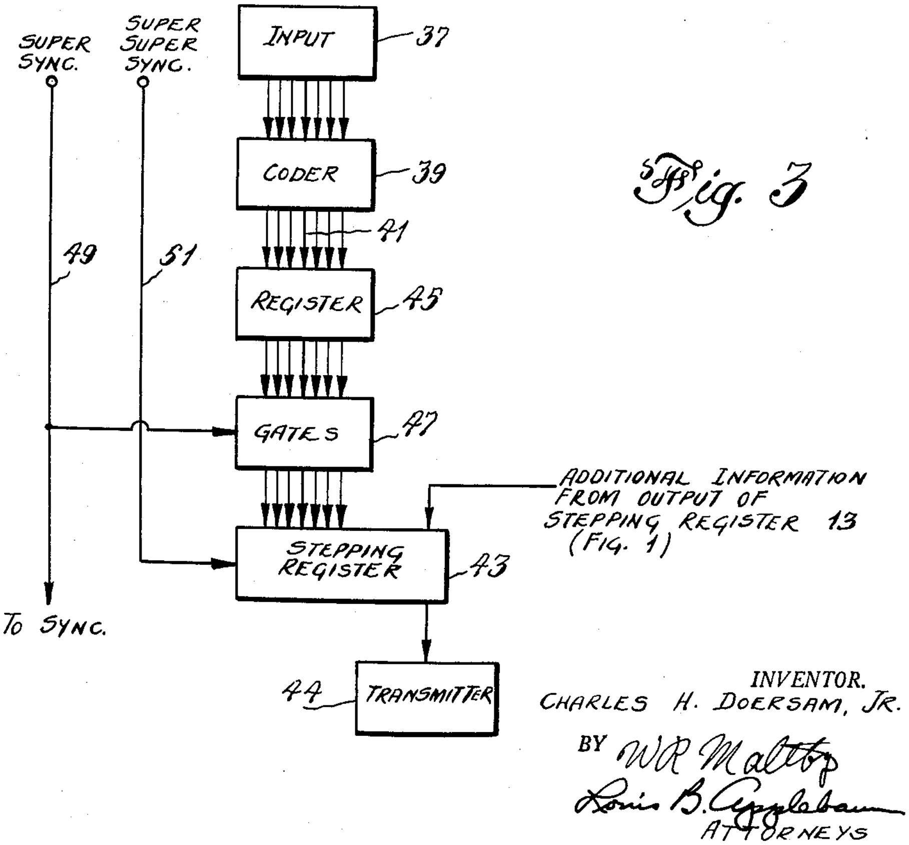
FIG. 3 is a block diagram of means of multiplexing information channels having different performance capabilities.

The multiplexing of a high performance information channel, characterized by relatively wider bandwidth and higher sampling rate, with a system operated at a comparatively lower sampling rate is shown in FIG. 3. The input can be a source 37 such as the AN/MKR-6 Telemetering Ground Station (described in the Handbook of Maintenance for Telemeter Receiving Set AN/MKR-6(XN-3) published by Direction of the Chief of the Bureau of Aeronautics, approved May 15, 1950), which puts out approximately fifty thousand pieces of information or "words" per second. The output of source 37 is coded by a separate coder 39 which puts out seven digit codes at the rate of fifty thousand per second on a parallel bus 41, and is fed to a stepping register 43 through seven digit register 45 and seven digit gates 47, and then to the transmitter 44. The stepping register 43 is larger than seven digits, preferably of the order of ten digits. The transfer and the stepping register are synchronized from the high performance data source 37 with a "super sync" line 49 and a "super super sync" line 51 respectively. With the system just described the "super sync" would be an actuating signal recurring at a rate of 50,000 times per second (the frame repetition rate of the multiplexer) and the "super super sync" would be an actuating signal recurring at the rate of 500,000 times per second (the pulse repetition rate of the multiplexer). (The generators which provide these signals are not shown in FIG. 3.) The stepping register 43 also generates a wider marker pulse at the beginning of each frame of information, so that the information as seen on the link will appear, in one 20 microsecond sec frame, as a marker pulse followed by seven pulses of information, which are followed by three spare pulse positions for other information. Each one of the three additional digit positions provide a separate serial pulse link that can be modulated by the multiplexer of FIG. 1 by connecting the additional information at the output of the stepping register 13 of FIG. 1. In this case, the "super sync" 49 would be used to drive the synchronizer 19 (FIG. 1).

If desired, three information systems, such as that shown in FIG. 1, may be employed, each system providing the modulation for a different one of the three available links.

Thus, for example, if the high performance system had the capacity to handle 7-digit frames at a frame rate of 50,000 per second (350,000 pulses per second) and there were three lower performance systems feeding in additional information, one having a capacity of 16-digit frames 10 times a second (160 pulses per second), another having a capacity of 24-digit frames 10 times a second (240 pulses per second) and a third having a capacity of 7-digit frames 5,000 times a second (35,000 pulses per second), the multiplexer would be required to have a minimum capacity of 400,000 pulses per second. Thus, a multiplexer having a frame capacity of 10 digits and a frame repetition rate of 50,000 per second would be capable of multiplexing these four systems satisfactorily since it would provide a capacity of 500,000 pulses per second.

In employing the subject system with the AN/MKR-6 device, it is also to be noted that the output of such device generates a marker on the thirty sixth frame of each cycle, after which the cycle is repeated. This marker can be used to locate position within the three low performance channels, in lieu of the generation of a marker pulse as described above.

Figure 4:
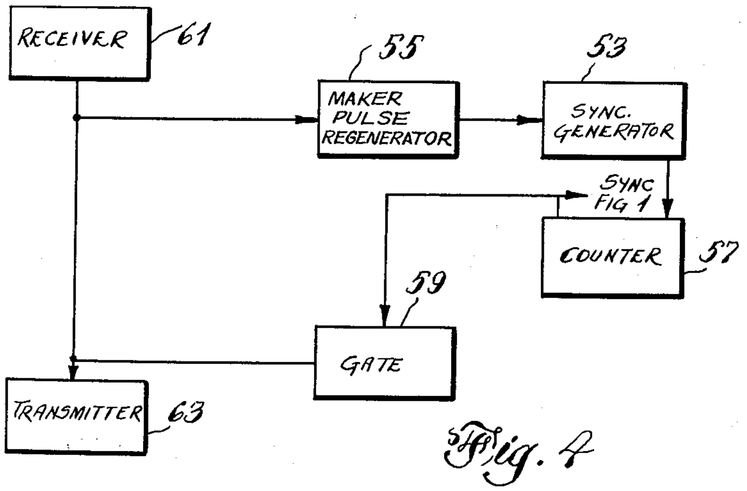
FIG. 4 is a block diagram of means to add information to one of the blank pulse positions in the ten digit frame of FIG. 3.

FIG. 4 illustrates the means for adding information to one of the blank pulse positions in the ten digit frame of the stepping register 43 of FIG. 3. In this application, the main source of information is located remotely and is relayed through the site where the relay multiplexer of FIG. 4 is located. Additional information is added in the open pulse spaces at the end of each basic word. The sync generator 53 generates the basic pulse repetition rate by suitable multiplication of the pulse repetition rate of the marker pulse generator 55. The marker pulse generator is a circuit which generates a pulse in response to each marker pulse in the received signal. (Thus, if a signal were received from the AN/MKR-6, there would be one marker pulse for every 36 frames.) The counter 57 is set to open the gate 59 at the proper pulse period, and the additional information is introduced through gate 59 from a system similar to that shown in FIG. 1, being introduced at the output of the stepping register 13 of FIG. 1 for delivery between receiver 61 and transmitter 63, coupled thereto. The choice of frame length is selected to be short enough so that the sync generator 53 will track within the allowable tolerances even where flutters of the basic pulse repetition rate reach levels of the order of ten percent.

Figure 5:
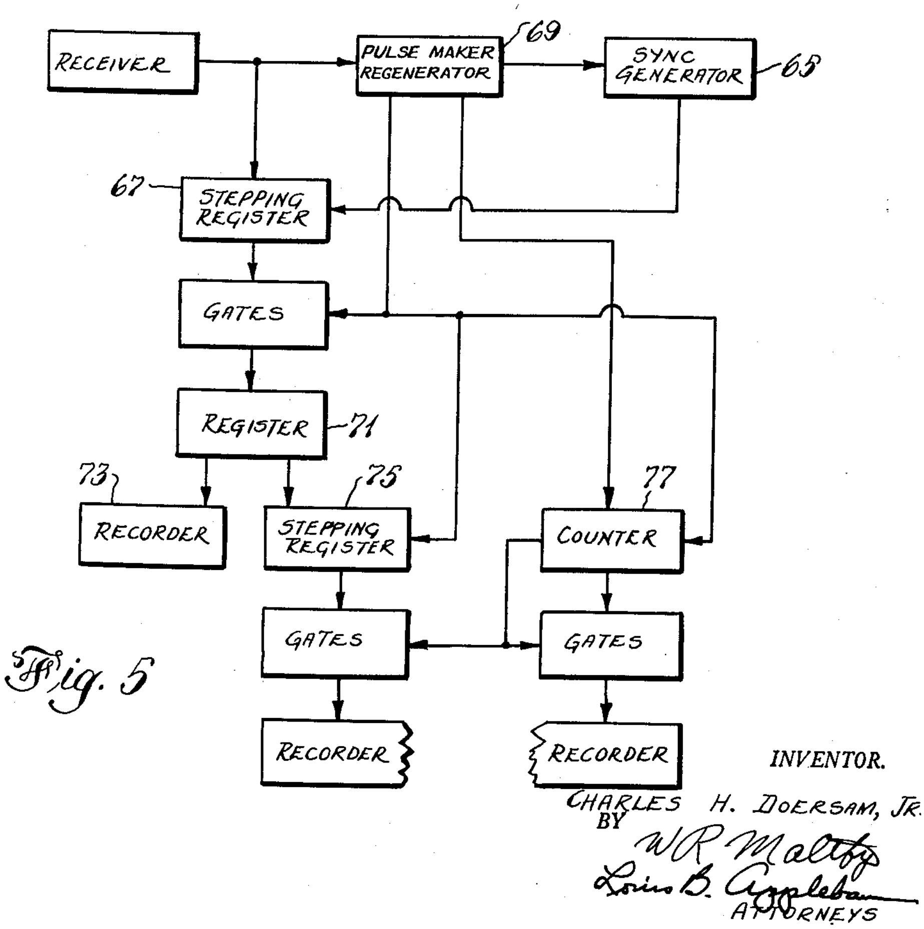
FIG. 5 is a block diagram of a receiving station demultiplexer for unscrambling the transmission of the system.

FIG. 5 illustrates a demultiplexer for use at the receiving station for unscrambling the information. The sync generator 65 is similar to that described for the relay station, sync generator 53. The regenerated sync is used to step a stepping register 67 the same length as the originating signal (for example, ten digits, as in the stepping register 43 of FIG. 3). The pulse marker 69 also generates the thirty sixth pulse frame sync. The frames are transferred to the register 71 over parallel paths under the control of the frame sync from the pulse marker generator 69. At this point, the data being transmitted, which constitutes the first seven digits, is recorded, as on a magnetic tape recorder unit 73 that includes a distributor and sampler. Each of the remaining three digits, of which only one is shown, is stepped into another stepping register 75. The register 75 is the same length as the source length of FIG. 1, eight digits. The thirty sixth frame sync from the pulse marker generator 69 is fed to a counter 77 to mark the beginning of each of the sixteen eight-digit words.

In order to make the transmission of all of this information self-checking, a one stage counter can be added. This counter is used to count the "1's" as they reach the serial transmission point, such as the input to the transmitter 27 of FIG. 1. If the count is odd, the counter will hold a "1," and if the count is even, the counter will hold a "0" at the end of the number. The contents of the counter is transmitted as a pulse or no pulse at the end of the word, for checking purposes. At the receiving end, all received words now must have an even number of pulses in order to be valid words, since the odd numbers have each had a pulse added to them at the transmitting end. To check for even number of pulses, it is only necessary to use another one stage counter and to note an error if this counter registers a "1" at the completion of any word. Thus, in the absence of directly compensating errors, a valid check is provided.

Obviously many modifications and variations of the present invention are possible in the light of the above teachings. It is therefore to be understood that within the scope of the appended claims the invention may be practiced otherwise than as specifically described.

I claim:

1. A pulse code multiplexing system comprising a plurality of input registers, a stepping register, said input register being coupled in parallel to said stepping register, matrix means controlling sequentially the transfer of pulses from said input registers to said stepping register, a plural-stage binary counter coupled to actuate said matrix means, and external synchronizing means coupled to said counter and to said matrix means, said synchronizing means determining the modulation rate of said system.

2. A pulse code multiplexing system comprising a plurality of input channels, each channel comprising a multi-digit pulse source, a register fed by said source, and gates coupled to the output of said register; a stepping register to which the outputs of said gates are coupled in parallel; matrix means having a coupling to each of said gates to control sequentially the transfer of pulses from said register through said gates to said stepping register; a plural-stage binary counter coupled to actuate said matrix means; and external synchronizing means coupled to said counter and to said stepping register driving said stepping register and selected stages of said counter to thereby determine modulation rate of said system.

3. The combination of claim 2 including a transmitter fed by the output of said stepping register.

4. The combination of claim 3 including quantizing means introducing delay in the path of the control signal from said matrix means to each of said gates during change in the input signal to said gates.

5. The combination of claim 3 including means to add information at a relaying station, said means comprising a receiver adapted to receive the output of said stepping register, a marker pulse generator adapted to regenerate the pulse repetition rate of the system, a sync generator coupled to said marker pulse generator and adapted to multiply such pulse repetition rate, a counter actuated by said sync generator, a gate adapted to be opened by said counter and coupled to the output of said receiver, means coupling such additional information to said gate, and means to transmit the combined output from said receiver and said gate.

6. In a pulse code system having a multi-digit pulse source, a register fed by said source, gates coupled to the output of said register, and matrix means to control said gates, a quantizing circuit comprising a normally closed gate and a normally open gate connected in parallel between said source and said gates and between said matrix means and said gates, and delay means, said normally open gate being coupled to said gates and said normally closed gate being coupled to said gates through said delay means.

7. A multiplexing system for combining the outputs of at least two separate pulse code systems comprising, in combination: a first register having a plurality of digit positions for registering incoming plural-digit code groups from a first pulse code system; a second register having a plurality of digit positions for serializing the incoming plural-digit code groups from a second pulse code system; a plurality of gates connected to said first register; a stepping register having a plurality of digit positions, the output of each of said gates being connected to a different one of said digit positions and the serialized output from said second register being connected to at least one of the remaining digit positions; first synchronizing means connected to said plurality of gates and to said second register for permitting the output of said first and second registers to pass simultaneously to said stepping register at a predetermined repetition rate; and second synchronizing means connected to said stepping register for permitting the individual digits of the combined code groups registered therein to be stepped out in sequence at a predetermined rate, the resultant output of the multiplexing system being a series of time-spaced pulses which form code groups in which pulses from both said pulse code systems are interleaved.

References Cited in the file of this patent

UNITED STATES PATENTS

| | | |
|---|---|---|
| 2,689,950 | Bayliss et al. | Sept. 21, 1954 |
| 2,719,285 | Greenfield | Sept. 27, 1955 |
| 2,754,503 | Forbes | July 10, 1956 |
| 2,799,727 | Segerstrom | July 16, 1957 |
| 2,811,713 | Spencer | Oct. 29, 1957 |

OTHER REFERENCES

Electronic Equipment, August 1955, pp. 12, 13.

Advertising Circular: "Librascope Analog-Digital Converter," Librascope, Inc., Glendale, Calif., 1955.